Figure 1:
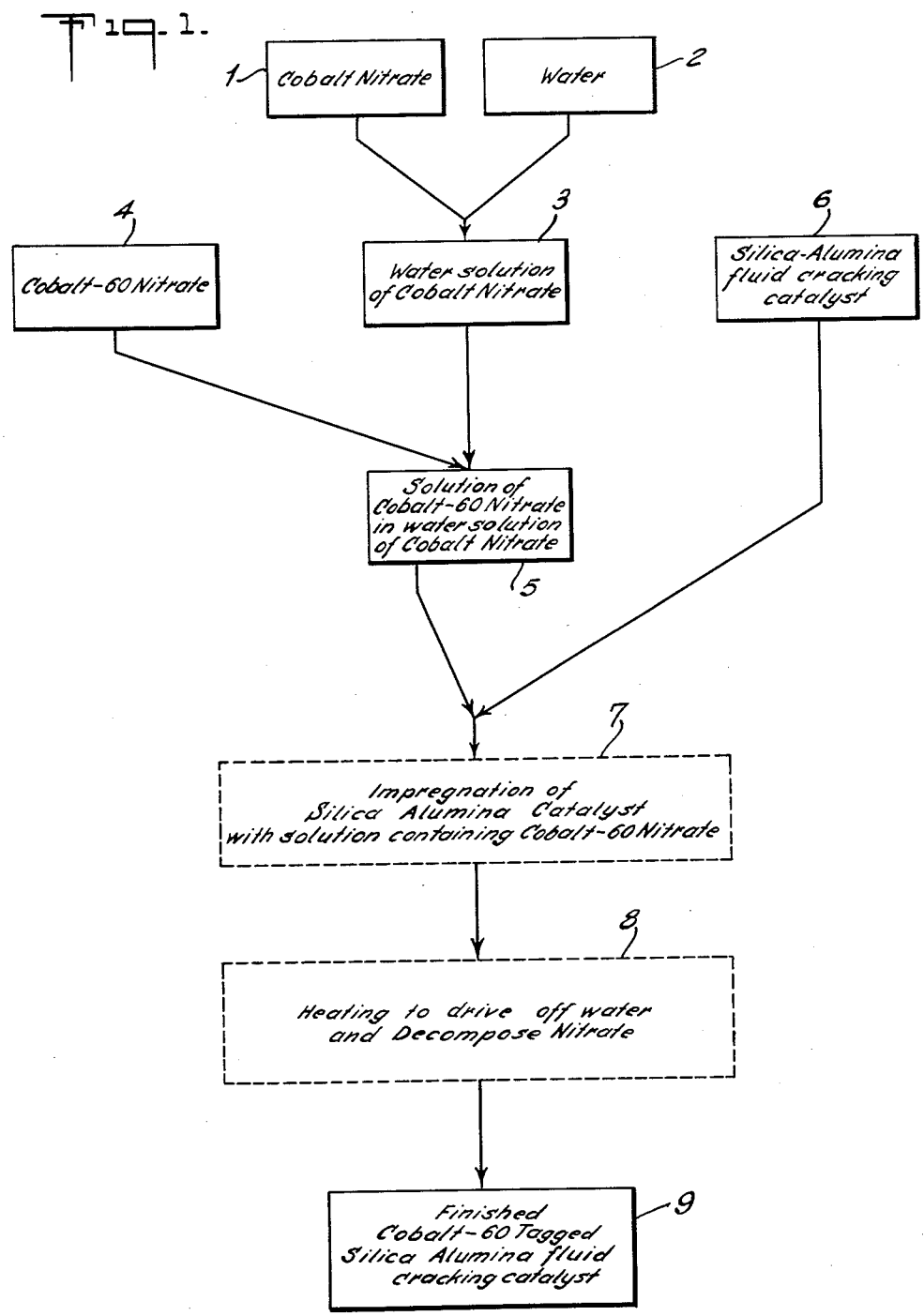

3,039,975
STUDY OF CATALYST FLOW IN FLUID CATALYTIC CRACKING BY MEANS OF RADIOACTIVE TRACERS

John J. Mitchell, Fishkill, N.Y., and Arthur J. Kinsella, Jr., Port Arthur, Tex., assignors to Texaco Inc., a corporation of Delaware
Filed July 2, 1956, Ser. No. 595,482
3 Claims. (Cl. 252—455)

This invention relates to a novel radioactive fluid cracking catalyst, the method of preparing said catalyst, and the method of determining flow characteristics in a fluid catalytic cracking process using said catalyst. The catalyst of this invention is particularly useful in the study of catalyst flow, mixing, and losses from fluid catalytic cracking equipment. We have found that a useful and novel catalyst may be prepared by tagging a silica alumina cracking catalyst with cobalt-60. Throughout this application, radioactive cobalt is designated by adding the atomic weight as a suffix, "cobalt-60." Where no suffix is employed, reference is made to the naturally occurring form of cobalt.

According to this invention a novel catalyst is prepared which comprises essentially a silica-alumina composite in particulate form uniformly interpenetrated with cobalt-60. This catalyst is prepared by uniformly admixing a water solution of cobalt-60 nitrate and cobalt nitrate with a silica-alumina composite fluid cracking catalyst to form a cobalt-60 nitrate, cobalt nitrate, impregnated catalyst. This impregnated catalyst is heated to decompose the nitrate to form the corresponding oxide.

The catalyst flow characteristics in a fluid catalytic cracking process may be determined by preparing a radioactive catalyst as described above, injecting said catalyst into a fluid cracking unit, determining the level of radioactivity of a fluid catalyst stream and determining the proportion of radioactive catalyst present in said stream from the level of radioactivity of said stream.

Many catalyst flow problems encountered in fluid cracking are peculiar to a given plant unit and cannot be studied satisfactorily on pilot units. Heretofore, there has been no direct method of studying these problems and it has been necessary to resort to indirect methods or to rely on estimates. One of the primary obstacles to measuring fresh catalyst mixing and loss rates has been the relative impossibility of distinguishing fresh catalyst from any other catalyst in a mixture of the two. We have now found that a portion of the catalyst added to a fluid cracking system may be distinguished from the great bulk of catalyst in the system by tagging an aliquot of fresh make-up catalyst with a radioactive label. However, for such tagged catalyst to be useful, it must possess identical qualities with regard to flow characteristics and attrition characteristics as compared with an untagged catalyst. Uniformity of distribution of the radioactive label is essential since otherwise attrition of the catalyst might result in the production of fines having a different level of radioactivity from the bulk of the tagged catalyst. We have found that a uniform distribution of radioactivity in a silica-alumina cracking catalyst can be achieved by impregnation of a silica-alumina catalyst with a solution of cobalt-60 nitrate followed by heating of the impregnated catalyst to drive off the moisture and decompose the nitrate to the oxide. Using the radioactive catalyst described above, we have now been able to study problems of catalyst mixing, flow, losses, and attrition in an operating fluid cracking unit without interference with its normal commercial operation. By injecting a tagged catalyst containing about 50 millicuries of radioactive cobalt into a fluid cracking unit containing about 550 tons of catalyst, sufficient tagged catalyst is injected so that the radioactivity level of the circulating streams may be readily determined and yet the radioactivity level is low enough so that no radiological hazard is created.

The novel catalyst of this invention may also be employed advantageously in the control of fluid catalyst cracking equipment. For example, a radioactive tagged fluid catalyst, may be added continuously or from time to time to maintain the catalyst in the system at an equilibrium radio-active level. The level of catalyst in catalyst containing vessels may then be readily determined by means of radiation detectors located outside said vessels. Said radiation detectors may be employed to actuate control means admitting or withdrawing catalyst from said vessels to control the level of catalyst therein. Similarly, catalyst containing oil streams may be continuously monitored by radiation detection to determine the radioactivity level and catalyst content. Said radiation detectors may be employed to actuate control means to withdraw catalyst containing oil for separation and thereby effect control of the catalyst content of said catalyst containing oil. Catalyst losses may also be continuously determined by monitoring streams discharged from the cracking unit for radioactivity.

Figure 2:
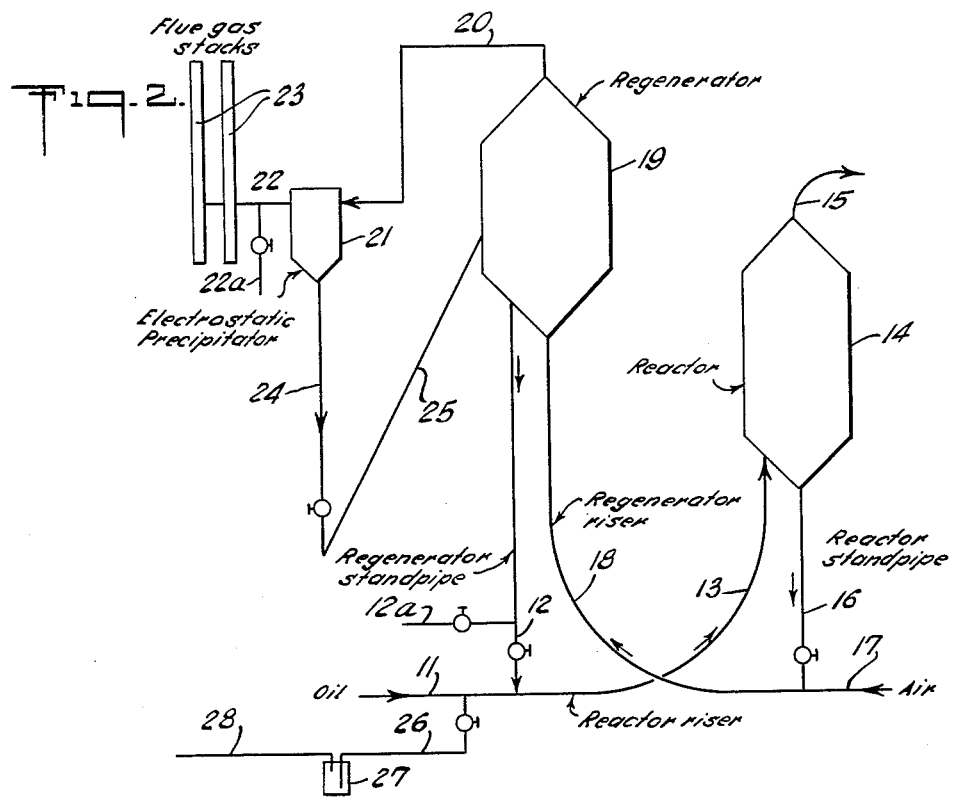
Figure 3:
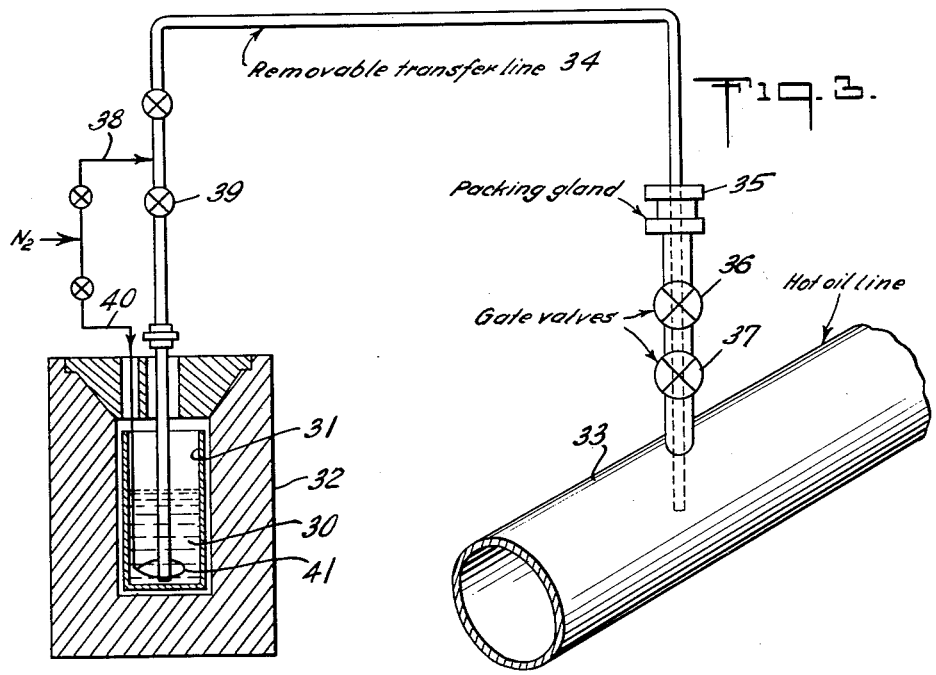

The accompanying drawings diagrammatically illustrate the method of preparing and using a radioactive catalyst in accordance with this invention. FIGURE 1 is a diagrammatic representation of the method of preparing radioactive fluid cracking catalyst. FIGURE 2 is a flow diagram of a fluid cracking unit illustrating injection of radioactive catalyst. FIGURE 3 is a drawing of a preferred embodiment of catalyst injection equipment. Although the drawings illustrate particular embodiments of the process of this invention, it is not intended to limit the invention to the particular materials or apparatus described.

In the FIGURE 1 materials are shown enclosed in solid lines and processing steps are indicated enclosed in dotted lines. With reference to FIGURE 1, cobalt nitrate 1 is dissolved in water 2 to form a solution of cobalt nitrate 3. Cobalt-60 nitrate 4 is dissolved in the water solution of cobalt nitrate to form a water solution of cobalt-60 nitrate 5.

We prefer to provide a large excess of cobalt compared with the cobalt-60 in the solutions handled. This excess is provided to minimize any possible loss of radioactive material which might result from migration of cobalt-60 ions into the walls of the containers and transfer apparatus. A known amount of radioactive cobalt may be employed so that the amount of radioactive cobalt in the finished product can be determined from the charge materials. Of course, assay or analysis of the finished product may be used to determine the amount of radioactive cobalt added.

It may be advantageous to withdraw an aliquot of the impregnating solution to prepare standard samples for calibration or comparison purposes. In this way, comparable samples having definite ratios of cobalt-60 may be prepared. Sufficient water is employed in the impregnating solution so that about 0.25 to 0.33 milliliter of solution are produced per gram of catalyst to be impregnated. However, the amount of solution may be varied within limits so that there is enough solution to wet the catalyst but not so much that a supernatant layer of solution forms. A silica-alumina fluid cracking catalyst 6 is then admixed with the cobalt-60 nitrate, cobalt nitrate solution to impregnate the catalyst with the solution. In step 7, the catalyst and solution are mixed thoroughly to insure uniform impregnation. The impregnated catalyst is then heated to drive off water and decompose the nitrate to form the corresponding oxides in step 8. Product from step 8 is finished cobalt-60 tagged silica-alumina cracking catalyst 9.

The radioactive content of catalysts prepared by the process of this invention may be varied greatly depending upon the intended use. For example, where it is intended to add a radioactive catalyst to a large mass of non-radioactive catalyst for the study of flow in a commercial cracking equipment, relatively high concentrations, for example, about 30 to 250 microcuries per gram of dry catalyst may be employed. Where the flow characteristics of undiluted radioactive catalysts are studied, lower radioactive levels may be desired, for example, about 8 to $60 \times 10^{-6}$ microcuries per gram. Concentrations intermediate the two ranges may be employed depending upon the amount of dilution encountered in a given application.

Several factors must be considered in selecting radioactive materials for use in the process of this invention. For example, the radioactive material must not vaporize nor be converted to a product which would vaporize at the high temperature and in the environment encountered in catalyst cracking. It is also desirable that the radioactive material be a high energy gamma emitter so that absorption of the radiation by the silica-alumina catalyst will not seriously decrease counting sensitivity. We have found cobalt-60 to be well adapted for tagging fluid cracking catalyst and we prefer cobalt-60 for this application. However, other radioactive materials, for example, silver-110, antimony-124, scandium-46 and cerium-144, may be employed in the process of this invention.

In the impregnating step, it is convenient to employ the radioactive material as a solution of the nitrate. Other compounds may be employed, but we prefer to employ a compound which may be decomposed to the corresponding oxide by heating to a temperature of less than about 1000° F. Either inorganic or organic compounds of radioactive materials may be employed in the process of this invention.

The fluid cracking catalyst selected for use in accordance with this invention is ordinarily that catalyst which is employed as make-up catalyst for the fluid catalyst cracking unit in which catalyst flow is to be studied. However, any fluidizable solid may be employed the behavior of which in a fluid cracking unit is of interest. Natural clays, treated clays and synthetic silica-alumina composite catalysts in particulate form are employed as fluid cracking catalysts. Fluid cracking catalysts generally have an average particle size of from about 20 to 80 microns and may vary between about 5% and 50% retained on a 100 mesh screen (U.S. standard).

A typical fluid catalytic cracking unit is shown in FIGURE 2. Oil charge from an external source, not shown, is introduced through transfer line 11, admixed with hot regenerated catalyst from standpipe 12 and passed through reactor riser 13 to reactor 14. The oil feed is cracked in reactor 14 and reaction products pass through line 15 to product recovery facilities not shown. Catalyst from the reactor is withdrawn through standpipe 16 and transferred in an air stream from line 17 through regenerator riser 18 to the regenerator 19. Coke deposited on the catalyst in the reactor is burned off the catalyst in the regenerator. Flue gas from the regenerator is discharged through line 20, electrostatic precipitator 21, line 22 and discharged to the atmosphere through stacks 23. Fine catalyst recovered from the flue gas in the electrostatic precipitator is returned to the regenerator by way of standpipe 24 and line 25.

Radioactive catalyst in bomb 27 is displaced with nitrogen in line 28, from an external source not shown, and is injected into oil feed line 11 through line 26. Catalyst samples may be withdrawn from catalyst streams where desired. For example, catalyst representative of that circulating within the cracking unit may be withdrawn from standpipe 12 through sample line 12a. Catalyst representative of that lost from the unit to the atmosphere may be obtained by withdrawing a sample of gas passing from the electrostatic precipitator to the stacks in line 22 through sample line 22a and filtering the gas so withdrawn to separate entrained catalyst.

The injection apparatus is shown schematically in FIGURE 3. Prior to injection, the tagged catalyst 30 is contained in a stainless steel injection bomb 31 enclosed in steel safe 32. The injection bomb is connected to discharge into the hot oil line 33 through removable transfer line 34 which passes through packing gland 35 and gate valves 36 and 37. The transfer line is flushed continuously with nitrogen from line 38 to prevent the entrance of oil vapors. During injection of the radioactive catalyst, valve 39 is opened and nitrogen is admitted to bomb 31 through line 40 and distributing ring 41 to fluidize the tagged catalyst and force it through the transfer line 34 into hot oil line 33.

A specific application of the invention is described in the following example. A radioactive catalyst is prepared by the following process:

About 350 grams of a synthetic silico-alumina fluid cracking catalyst in the form of microspheres ranging from less than 1 micron in diameter to more than 80 microns with an average particle size of about 40 microns is weighed into a bomb. The catalyst, as weighed, contains about 15% adsorbed moisture and therefore amounts to about 300 grams on a dry basis. A solution of cobalt nitrate is prepared by dissolving 53 grams of $Co(NO_3)_2 \cdot 6H_2O$ in 500 milliliters of water. Fifty millicuries of cobalt–60 in the form of a solution of cobalt–60 nitrate is diluted with the aforesaid cobalt nitrate solution to form 100 milliliters of solution. This solution comprising 50 millicuries of cobalt–60 in a cobalt nitrate solution is then added to the silica-alumina catalyst and mixed by stirring until an appearance of homogeneity is obtained. The impregnated catalyst is then heated to a temperature of about 700 to 770° F. and held at this temperature for about 10 hours. The catalyst is then cooled and is ready for use. This catalyst comprises about 167 microcuries of cobalt–60 per gram of dry cracking catalyst impregnated.

A catalyst is impregnated according to the above procedure except the amount of cobalt–60 in the cobalt nitrate solution is reduced to produce a catalyst containing about $42 \times 10^{-6}$ microcuries of cobalt–60 per gram of dry catalyst. After impregnation, the catalyst is heated to a temperature in the range of about 800 to 900° F. for about fifteen hours to drive off moisture and decompose the nitrate. This catalyst is then exposed to the atmosphere to regain equilibrium moisture content. It is then elutriated to remove fines less than 20 microns in diameter. The fines free impregnated catalyst is then subjected to accelerated attrition to effect comminution. The comminuted catalyst is then fractionated by elutriation to separate the fine products of attrition from the coarse products. The relative amount of cobalt–60 present in the uncomminuted catalyst and the coarse and fine products of attrition are shown in the following table:

| Sample: | Specific activity [1] counts per minute per gram |
|---|---|
| 1. Fines-free catalyst charge | 1,049 |
| 2. Coarse product from attrition of 1 | 1,050 |
| 3. Fine product from attrition of 1 | 1,047 |

[1] Specific activity is defined as counts per minute per gram of sample detected with a given radiation detector. The number of counts detected from a given amount of radioactive material present depends upon the sensitivity of the instrument employed. Specific activity may be employed as a measure of the relative radioactivity level of several samples or to determine the amount of radioactive material present in a given sample by comparison with a sample of known radioactivity content.

The variation between the specific activity of the samples in the above tabulation is within the experimental accuracy of the observed data. It is apparent that the products of attrition have the same radioactive concentration as the original charge catalyst. Since the attrition process consists primarily of the erosion of fine fragments from the surface of the catalyst particles, anything other than a uniform distribution of radioactivity throughout the catalyst particles would result in a preferential concentration of radioactivity in one of the products of attrition. It may, therefore, be concluded that catalyst prepared in accordance with this invention comprises a cracking catalyst uniformly interpenetrated with cobalt–60.

Samples of untreated catalyst, and the same catalyst impregnated with cobalt nitrate, dried and calcined by the method of this invention, when subjected to attrition, are found to have the same attrition rate within the limits of precision of the test employed. These data show that catalyst prepared by the process of this invention may be expected to exhibit the same attrition characteristics as untreated catalyst when injected into an operating fluid catalytic cracking unit.

A study of flow characteristics in a fluid catalytic cracking unit is made by injecting about 350 grams of radioactive catalyst containing 167 microcuries of cobalt–60 per gram basis dry catalyst (a total of 50 millicuries of cobalt–60) into a fluid catalyst cracking unit containing about 550 tons of catalyst. Variations in the radioactivity content of the circulating catalyst within the unit and the catalyst lost to the atmosphere through the flue gas stacks are determined by sampling these streams and counting the radioactivity of the catalyst samples. Circulating catalyst is advantageously sampled from the regenerator standpipe. The catalyst leaving the stacks may be sampled by filtering a portion of the flue gas to separate entrained catalyst. The catalyst samples are counted for gamma activity with a high sensitivity radiation detector. Results are expressed as specific activity in counts per minute per gram of catalyst. The radioactivity level of any sample is a direct measure of the amount of tagged catalyst in that sample. The concentration of tagged catalyst may be determined by comparing the specific activity of a given sample with the specific activity of a standard catalyst containing a known amount of radioactivity. A sample of equilibrium unit catalyst after injection of radioactive catalyst has a specific activity of 11.4 counts per minute per gram. The average specific activity of samples of catalyst passing to the flue gas stacks during the first 22 hours after injection of the radioactive catalyst is 16.5. From these data the loss of fresh catalyst is calculated to be 144% of the loss of equilibrium catalyst. On the day of this test 7.1 tons of catalyst were lost from the flue gas stacks to the atmosphere. The total amount of cobalt–60 added to the cracking unit was calculated to yield $5.7 \times 10^9$ counts per minute. The loss of activity in 7.1 tons of catalyst having a specific activity of 16.5 amounts to $1.1 \times 10^8$ counts per minute. The loss of freshly added catalyst in the first day then amounts to $$\frac{1.1 \times 10^8}{5.7 \times 10^9}$$

or 1.9%.

Samples of unit catalyst taken at 15 minute intervals show that most of the mixing of the radioactive catalyst occurs within an hour after the radio active catalyst is added.

Obviously many modifications and variations of the invention as hereinbefore set forth may be made without departing from the spirit and scope thereof and only such limitations should be imposed as are indicated in the appended claims.

We claim:

1. As an article of manufacture a radioactive tagged catalyst which comprises essentially a silica-alumina fluid cracking catalyst having an average particle size within the range of about 20 to 80 microns uniformly interpenetrated with cobalt-60 in an amount within the range of about $8 \times 10^{-6}$ to 250 microcuries per gram, said catalyst characterized by a specific activity unchanged by comminution and fractionation into coarse and fine fractions.

2. The method of preparing a radioactive tagged catalyst which comprises preparing a solution of cobalt-60 nitrate in a water solution of cobalt nitrate, uniformly admixing said solution with a fluid cracking catalyst in proportion of about 0.25 to 0.33 milliliter of said solution per gram of said catalyst forming a cobalt-60 nitrate and cobalt nitrate impregnated catalyst without formation of a supernatant layer of solution, and heating said impregnated catalyst to a temperature less than about 1000° F. driving off said water and decomposing said cobalt-60 nitrate and cobalt nitrate to cobalt-60 oxide and cobalt oxide respectively.

3. The method of claim 2 in which said solution contains about $8 \times 10^{-6}$ to 250 microcuries of cobalt-60 per gram of cracking catalyst impregnated.

References Cited in the file of this patent

UNITED STATES PATENTS

| | | |
|---|---|---|
| 2,377,832 | Wallis et al. | June 5, 1945 |
| 2,517,036 | Sensel et al. | Aug. 1, 1950 |
| 2,560,433 | Gilbert et al. | July 10, 1951 |
| 2,575,134 | Schultz et al. | Nov. 13, 1951 |
| 2,700,111 | Jacobs et al. | Jan. 18, 1955 |
| 2,726,144 | Wallis | Dec. 6, 1955 |
| 2,744,199 | Juterbock et al. | May 1, 1956 |
| 2,769,913 | Mazzagatti | Nov. 6, 1956 |

OTHER REFERENCES

Hull et al.: "Radioisotopes in Petroleum Refining, Research an Analysis," Proceedings of the International Conference on the Peaceful Uses of Atomic Energy, vol. 15, pages 199 to 210.

Hull: "Using Tracers in Refinery Control," Nucleonics, vol. 13, No. 4, pp. 18 to 21 (April 1955).